Nov. 9, 1965  S. M. PARKER ETAL  3,216,862
ION-PERMEABLE BATTERY PLATE SEPARATOR
Filed Dec. 28, 1961

United States Patent Office 3,216,862
Patented Nov. 9, 1965

3,216,862
ION-PERMEABLE BATTERY PLATE SEPARATOR
Scott M. Parker, Mount Holly, N.C., and Ralph L. Wentworth, Watertown, Mass., assignors to W. R. Grace & Co., Cambridge, Mass., a corporation of Connecticut
Filed Dec. 28, 1961, Ser. No. 162,698
6 Claims. (Cl. 136—145)

This invention is concerned with plate separators for storage batteries of the lead-acid type and especially with a plate separator which is non-porous but ion permeable as contrasted with the porous or microporous conventional separator presently used.

The primary object of a battery separator is to prevent metallic conduction between the plates of opposite polarity while freely permitting electrolytic conduction. In a conventional lead-acid storage battery, the lead and lead compounds may grow from the plate outwardly forming structures which are known as "trees." If the "tree" completely penetrates the pores of a separator, an internal short circuit develops and the battery fails. In addition to "tree" growth, there is also the problem of scaling of paste particles from the positive plate. The scaled particles may fall to the bottom of the container where they do no harm. However, they may also lodge themselves in the pores of a conventional separator where such particles build up and make a metallic connection between the plates with consequent short circuiting. On the other hand, if the separator is non-porous and permeable only to ions in the electrolyte, neither "trees" nor shed particles can penetrate the membrane and internal short circuiting of the battery cannot take place.

Despite many previous attempts to produce ion permable membranes for use in lead-acid storage batteries, so far as we are aware, such membranes have not been successful. Most of the compositions have oxidized badly when in contact with the positive battery plate and many have softened or swollen in the battery acid. Also, a serious difficulty has been the fact that if the material is sufficiently stable under the oxidizing and acid conditions which exist in the cell, its electrical resistance (considered as a series resistance) is too high. The result is that the discharge rate of such a battery is much lower than is commercially permissible.

The objects of the present invention are to produce a non-porous ion-permeable battery separator which is low in resistance; to produce a separator which has high corrosion resistance in the envroinment of he cell; to produce a separator which is an effective barrier against scaling and "treeing"; to produce a separator which is wettable by the battery acid, is dimensionally stable, capable of maintaining the plate spacing in the cell, and which remains unaffected by its environment so that a long life for a battery may reasonably be expected.

These and other objects will become apparent from the specification and the drawing in which.

Figure 1:
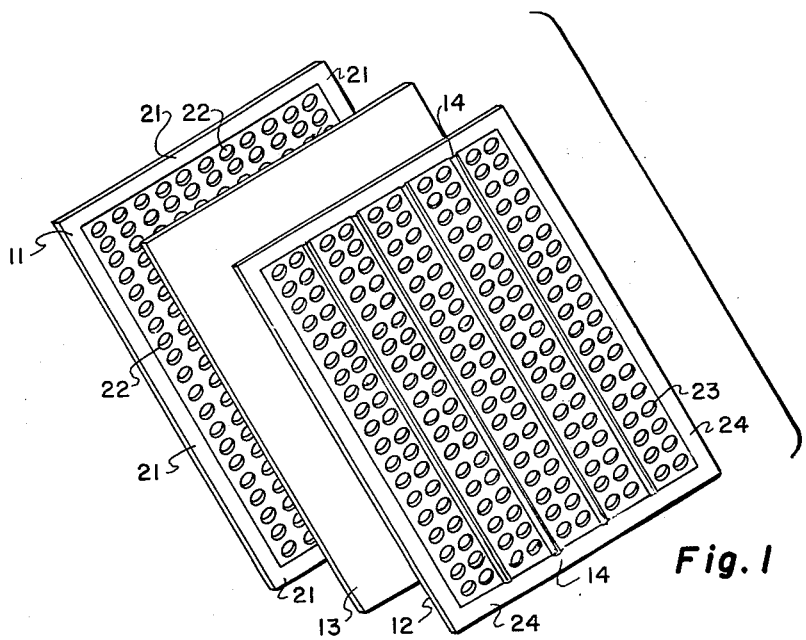
FIG. 1 is a projected view illustrating the component members of the separator in preassembled relationship.
Figure 2:
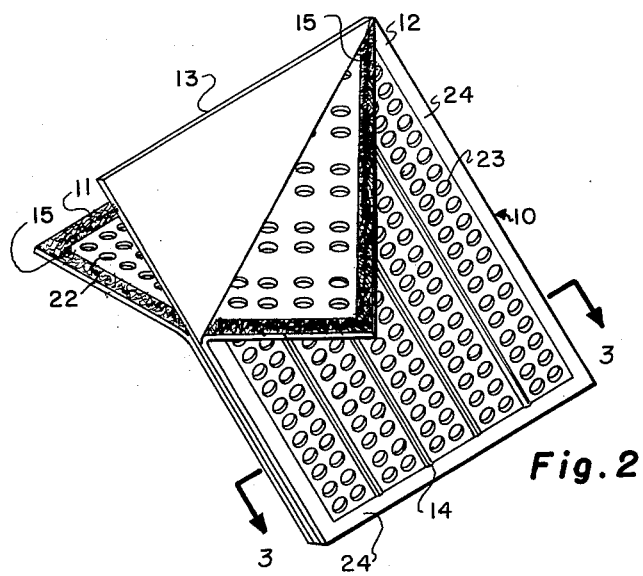
FIG. 2 is a perspective view showing the assembled separator with the members facing the negative and positive plates partly rolled away to show the construction more clearly.
Figure 3:
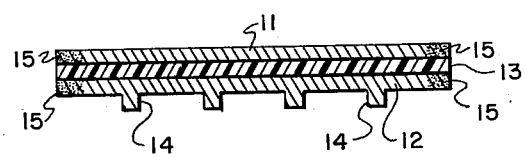
FIG. 3 is a cross section of the assembled separator taken on the line 3—3 of FIG. 2.

Referring to the drawing, the separator 10 is essentially a three-part structure comprising two perforated sheets 11 and 12 of an inert substance with the imperforate ion permeable membrane 13 interposed between the sheets. Perforated sheet 11 (which faces the negative plate) usually has a plane surface and is perforated except at the perimetrical margin 21 in an allover pattern of small holes 22 which removes approximately 50 percent of the area of the sheet.

The sheet 12 which faces the positive plate is similarly perforated with holes 23 except at the perimetrical margin 24 and for imperforate ribs 14, the latter of which extend in parallel lines from the top to the bottom of the separator in the manner of a conventional lead-acid separator. The height of the ribs is variable and is in accord with the specifications of the battery manufacturer. If the sheet is made by an extrusion process, the ribs are formed at the time that the sheet is extruded. They may also be rolled into the sheet or may be separately applied and adhered to the sheet either by heat fusion or by an adhesive.

The ion permeable membrane 13 is essentially the reaction product of a polyvinyl chloride and a substance the important ingredient of which is polyimidazoline. The polyimidazoline endows the polymer with thermoset properties. This reaction product has been described in an application for United States patent, by Elizabeth C. Dearborn and Philip K. Isaacs entitled Reaction Mixture Derived From Oleic Acid, Sebacic Acid and Triethylene Tetramine, Serial No. 78,851, filed December 28, 1960, new Patent No. 3,050,527. The entire disclosure of this application is hereby incorporated by reference.

Various polyvinyl chlorides are suitable. Commercial resins of somewhat low molecular weight and fine particle size are preferred since the film which results from the polyimidazoline-polyvinyl chloride reaction appears to be stronger, and crazing and cracking of the film in the film casting process occurs less frequently than when "hard" high molecular weight resins are used.

The exact structure of the polyimidazoline which has given successful results is as yet unknown. The average composition as determined by infrared absorption analysis shows that approximately 80 percent of the carboxyl groups originally associated with the carboxylic acids have been converted to polyimidazoline rings. The remaining 20 percent of the carboxyl groups exist in the reaction product as amide groups. The idealized polyimidazoline structure has been postulated as $$C_{17}H_{33}-\underset{\underset{CH_2}{\overset{N}{\diagdown}\diagup}}{\overset{C}{\underset{\|}{\overset{\|}{N}}}}-N-CH_2-CH_2-N-\underset{\underset{CH_2}{\overset{N}{\diagdown}\diagup}}{\overset{C}{\underset{\|}{\overset{\|}{N}}}}-C_8H_{16}-\underset{\underset{CH_2}{\overset{N}{\diagdown}\diagup}}{\overset{C}{\underset{\|}{\overset{\|}{N}}}}-N-CH_2-CH_2-N-\underset{\underset{CH_2}{\overset{N}{\diagdown}\diagup}}{\overset{C}{\underset{\|}{\overset{\|}{N}}}}-C_{17}H_3$$

In what follows, this reaction product will, for brevity, be called "polyimidazoline."

The material, which forms the ion-permeable membrane 13, is made up into a spreadable compound suitable for film casting procedures by mixing polyvinyl chloride, the "polyimidazoline," a phthalate type plasticizer, such as methyl, ethyl, n-butyl, n-hexyl, dioctyl, phenyl, cyclohexyl, and such mixed phthalates as n-octyl, n-decyl, n-butyl cyclohexyl and n-butyl benzyl, and a very small proportion of an acid acceptor, such as zinc oxide. The ratio of polyvinyl chloride to "polyimidazoline" in these mixtures may vary between 1.5:1 to 3:0. Preference is given to a ratio of between about 2:1 to 2.5:1 since it has been found that these ratios produce a film having lower electrical resistance. The proportion of the phthalate type plasticizer to the wet weight of the compound may range from 15 to 30 percent, and desirably is between about 20 to 25 percent. The proportions of acid accepter, zinc oxide, may range from about 0.5 to 1.5 percent.

Example I illustrates the procedure by which the "polyimidazoline" is made:

Example I 339 lbs. (1.2 moles) of oleic acid were charged to a glass vacuum vessel and then 121 lbs. (0.6 mole) of sebacic acid were added thereto. The acids were heated to about 70° C. and then 175 lbs. (1.2 moles) of triethylene tetramine were added. Due to the exothermic nature of the reaction between the amine and acids, the temperature of the mixture rose to about 100° C. 0.64 lb. of powdered sodium tripolyphosphate was then added as a metal chelating agent. Vigorous agitation and a nitrogen atmosphere were maintained throughout. The mixture was then heated at 1 atmosphere to about 150° C. and the temperature and pressure were carefully controlled thereafter as follows:

| Heating period in minutes after re-reaction mixture had reached 150° C. at 1 atm. | Temperature, ° C. | Pressure, mm. Hg. |
|---|---|---|
| 20 | 152.5 | 585 |
| 40 | 152.5 | 435 |
| 60 | 155 | 335 |
| 80 | 165 | 235 |
| 100 | 182.5 | 135 |
| 120 | 192.5 | 110 |
| 140 | 202.5 | 85 |
| 160 | 212.5 | 35 |
| 180 | 220 | 15 |

After a temperature of about 220° C. and a pressure of about 15 mm. Hg have been reached according to the foregoing schedule, the pressure and temperature were held at these values and the reaction was continued for about one hour. During this period, water of condensation was continuously removed to avoid hydrolysis of the polyimidazoline. The amount of water removed over the entire reaction period corresponded with about 80 percent conversion of the carboxyl groups to polyimidazoline groups, leaving a balance of about 20 percent of the carboxyl groups in the form of amides. Finally, the product was cooled under nitrogen to about 130° C.

Preparation of the material which is used to form the imperforate ion-permeable membrane 13 using the "polyimidazoline" of Example I is described in Example II:

Example II 50 parts of "polyimidazoline" of Example I were weighed into a container, which was capped to prevent entrance of oxygen, and heated to between 50° and 55° C. 38 parts of dioctyl phthalate were added to the warm reaction mixture and stirred until the ingredients were thoroughly blended together. The blended product was then strained through a fine mesh screen and stirred for approximately five minutes. 1.8 parts of zinc oxide were then thoroughly worked in the mixture. Stirring was continued for ten minutes. The speed of mixing was then raised so that a vortex was formed in the liquid, and the temperature was allowed to drop to 38° C. At that time, 100 parts of polyvinyl chloride ("Opalon 410") were added to the mixture. The polyvinyl chloride was added in small quantities so that lumping during mixing was avoided. As the mixture thickened, the speed of stirring was increased sufficiently to maintain the vortex at all times. Stirring was continued until the polyvinyl chloride was thoroughly incorporated (about 20 minutes). The mixture was then strained. In this example, all parts are by weight.

Ion-permeable membranes are cast from the mixture of Example II on a conventional plate film casting machine. Preferably the casting bed is a sheet of glass. The thickness of the liquid coat should be approximately twice that required for a dried film.

After the film has been spread on the glass plate, it is thoroughly dried in air (a mild heat is permissible). The film is cured on the plate in a forced draft oven at 177° C. for six minutes and then allowed to cool to room temperature. When room temperature is reached, the cured film is soaked with water to loosen it from its support, and subsequently dried. Films of 0.001 to 0.005 inch finished thickness have proved practical, e.g. multiple cast films of 0.025 to 0.003 inch thickness perform excellently.

The dried film is cut to appropriate size, laid on the perforated support member 11, and then covered with the perforated and ribbed support member 12. The perforations 22 and 23 occupy from 40 to 60 percent, e.g. 50 percent of the area of each sheet. The entire assembly may be held together with an acid-resistant solvent rubber cement 15 applied to the margins 21 and 24 of members 11 and 12, or the edges of the assembly may be fused together by heat-sealing. Heat-sealing is accomplished by pressing the assembly under a heated die which heats and compresses the marginal area.

Preferably the film should be built up in two or three steps. If a 0.003 inch sheet is to be made, it is recommended that a liquid sheet of 0.002 inch be first spread on the plate and this film allowed to dry thoroughly. Subsequent to drying, a second spread of 0.002 inch thickness should be made and, after drying, a third liquid spread of 0.002 inch follows. Despite the intermediate dryings, the film, after it is cured, shows no lamination and is a unitary product. Its dry thickness is 0.003 inch.

Multiple film casting has been found to produce superior ion permeable membranes which are completely free of pin holes. Pin holing sometimes occurs when the film casting takes place in a single step.

The following Example III gives another composition for preparing the ion-permeable membrane 13, in which the polyimidazoline and plasticizer content differ from the composition of Example II:

Example III

| Component | Parts by Weight | Percent |
|---|---|---|
| "Polyimidazoline" of Example I | 40 | 21.2 |
| Dioctyl Phthalate | 48 | 25.3 |
| Polyvinyl Chloride ("Opalon 410") | 100 | 52.7 |
| Zinc Oxide | 1.8 | 1.0 |

The polyimidazoline is a strong organic base and is highly reactive with polyvinyl chloride. It is unique in its ability to crosslink the polyvinyl chloride when the composition is heated at temperatures ranging between about 150° C. and 240° C.

The essential quality of the support elements 11 and 12 is inertness in the environment of a lead-acid cell, but the material also should lend itself to easy perforation without shattering, and be strong and tough to permit automatic interleaving, and permit rib rolling. A number of substances are suitable, but cost is a determining factor. Two substances which meet chemical and mechanical requirements and are low in cost are perforated polyvinyl chloride sheet and a sheet made from a high density polyethylene containing a small proportion of, e.g., 10 percent butyl rubber. (Butyl rubber is a copolymer of isobutylene with a small amount, about 2 percent, of diolefin, such as isoprene.) Sheet thicknesses of 0.010–0.020 are suitable. As an example, a complete separator may have a finished thickness (including rib thickness) of 105 mils and interpose a series resistance in a lead-acid cell of 62 milliohms per square inch. Perforations may range from the smallest practical punching diameters to ¼ inch. ⅟₁₆ inch perforations are preferred.

In use, the separators have proved to be rugged and lend themselves well to automatic assembly. The cells produce acceptable discharge rates and, especially when the ion-permeable membrane is made by the multiple-coat casting process, eliminate "treeing." Corrosion tests of the membrane have shown that it does not weaken or develop pin holes. Present separators, including the microporous types, show considerable corrosion in a comparable test.

We claim:

1. A plate separator for lead-acid storage batteries comprising a non-porous, ion-permeable membrane supported between two perforated sheets of a substance inert in battery acid, said membrane being the dried and cured reaction product of a mixture of from 1.5 to 3 parts of polyvinyl chloride, one part of polyimidazoline, a phthalate plasticizer, and a minor proportion of zinc oxide, said membrane being prepared by forming a film of the mixture, drying the film and heating the dried film at a temperature and for a time sufficient to cure the mixture, said polyimidazoline being derived by reacting oleic acid, sebacic acid, and triethylene tetramine in a molar ratio of 2:1:2 respectively in a nitrogen atmosphere at a temperature of about 150 to 220° C. and pressure of 15 to 760 mm. Hg while continuously removing the water of reaction and continuing the reaction until the flow of water substantially ceases.

2. A plate separator for lead-acid storage batteries as defined in claim 1 in which the ion permeable membrane is supported between perforated sheets of an inert plastic substance having a thickness of from 0.0010 to 0.0020 inch.

3. A plate separator as defined in claim 1 wherein the perforations in the supporting sheets occupy from 40 to 60 percent of the area of the sheet and wherein the diameter of the perforations is not in excess of ¼ of an inch.

4. A plate separator for lead-acid storage batteries as defined in claim 1 wherein the assembly of plastic supporting sheets and the ion permeable membrane is maintained by an acid-resistant cement applied to the margins of each unit of the assembly, said cement forming an edge seal of the assembly at the margin of the separator.

5. The method of forming a plate separator suitable for use in lead-acid storage batteries which comprises, forming a spreadable mixture of from 1.5 to 3 parts of polyvinyl chloride, one part of polyimidazoline, a phthalate plasticizer, and a minor proportion of zinc oxide, said polyimidazoline being derived by reacting oleic acid, sebacic acid, and triethylene tetramine in a molar ratio of 2:1:2 respectively in a nitrogen atmosphere at a temperature of about 150 to 220° C. and pressure of 15 to 760 mm. Hg while continuously removing the water of reaction and continuing the reaction until the flow of water substantially ceases, spreading the mixture on a support to form a film, drying the film, reacting the dried film by heating it to approximately 177° C. for a period of approximately six minutes, removing the film from the support, cutting the film to separator size, interposing the film between perforated sheets of a plastic substance inert in the battery acid, and edge sealing the supporting sheets and the ion permeable membrane to form a unitary plate separator structure.

6. The method of claim 5 wherein the liquid mixture is spread on a casting plate in a plurality of coats and wherein each separate coat is dried prior to subjecting the multiple coatings to the reaction temperature.

References Cited by the Examiner

UNITED STATES PATENTS

| | | | |
|---|---|---|---|
| 1,786,328 | 12/30 | Benner et al. | 136—145.5 |
| 2,772,322 | 11/56 | Witt et al. | 136—145.4 |
| 3,036,143 | 5/62 | Fisher et al. | 136—145 |
| 3,050,527 | 8/62 | Dearborn et al. | 260—309.6 |
| 3,050,528 | 8/62 | Dearborn et al. | 260—309.6 |

WINSTON A. DOUGLAS, *Primary Examiner*.

JOHN H. MACK, *Examiner*.